US009282525B2

(12) United States Patent
Zeng et al.

(10) Patent No.: US 9,282,525 B2
(45) Date of Patent: Mar. 8, 2016

(54) FREQUENCY-DOMAIN SYMBOL AND FRAME SYNCHRONIZATION IN MULTI-CARRIER SYSTEMS

(71) Applicants: Jianqiang Zeng, Austin, TX (US);
Steven M. Bosze, Cedar Park, TX (US);
Raja V. Tamma, Leander, TX (US);
Kevin B. Traylor, Austin, TX (US);
Khurram Waheed, Austin, TX (US)

(72) Inventors: Jianqiang Zeng, Austin, TX (US);
Steven M. Bosze, Cedar Park, TX (US);
Raja V. Tamma, Leander, TX (US);
Kevin B. Traylor, Austin, TX (US);
Khurram Waheed, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/925,023

(22) Filed: Jun. 24, 2013

(65) Prior Publication Data

US 2014/0376540 A1    Dec. 25, 2014

(51) Int. Cl.
*H04K 1/10* (2006.01)
*H04L 27/28* (2006.01)
*H04W 56/00* (2009.01)

(52) U.S. Cl.
CPC ............................ *H04W 56/0005* (2013.01)

(58) Field of Classification Search
CPC .. H04W 56/00; H04W 72/042; H04L 5/0048; H04L 5/0007
USPC ........................................................ 375/260
See application file for complete search history.

(56) References Cited

U.S. PATENT DOCUMENTS

| 5,263,048 | A | | 11/1993 | Wade |
| 5,495,498 | A | * | 2/1996 | Tominaga ............. H04J 3/0611 370/441 |
| 6,002,807 | A | * | 12/1999 | Guerci ......................... 382/278 |
| 6,230,122 | B1 | | 5/2001 | Wu et al. |
| 6,359,933 | B1 | | 3/2002 | Aslanis et al. |

(Continued)

FOREIGN PATENT DOCUMENTS

| EP | 1479186 B1 | 7/2007 |
| EP | 2445157 A1 | 4/2012 |
| WO | WO0004657 | 1/2000 |

OTHER PUBLICATIONS

Nandula et al., "Robust Timing Synchronization for OFDM Based Wireless Lan System", IEEE, 4 pgs (2003).

(Continued)

*Primary Examiner* — Shuwang Liu
*Assistant Examiner* — Gina McKie
(74) *Attorney, Agent, or Firm* — Egan, Peterman, Enders & Huston LLP

(57) ABSTRACT

Methods and systems are disclosed for frequency-domain symbol and frame synchronization for multi-carrier communication systems. Received signals are sampled and converted into frequency components associated with subcarriers within the multi-carrier communication signals. Symbol synchronization is performed in the frequency domain by performing correlation(s) between frequency components of the received signal and frequency-domain synchronization symbol(s). After symbol synchronization, frame synchronization correlation is also performed in the frequency domain between frequency components of the received signal and frequency-domain synchronization symbol(s). The disclosed embodiments are particularly useful for symbol and frame synchronization in multi-carrier received signals for power line communication (PLC) systems and/or other harsh noisy communication environments.

27 Claims, 7 Drawing Sheets

(56) References Cited

U.S. PATENT DOCUMENTS

| | | | |
|---|---|---|---|
| 6,411,662 | B1 | 6/2002 | Sakoda et al. |
| 6,748,036 | B1 | 6/2004 | Tsurumaru |
| 6,785,429 | B1 | 8/2004 | Senoh |
| 6,912,262 | B1 * | 6/2005 | Chini et al. ............... 375/365 |
| 6,993,084 | B1 | 1/2006 | Eberlein et al. |
| 7,856,063 | B2 | 12/2010 | Coulson |
| 7,986,922 | B2 | 7/2011 | Glazko et al. |
| 8,068,570 | B2 | 11/2011 | Catreux et al. |
| 8,085,879 | B2 | 12/2011 | Birkett et al. |
| 8,139,614 | B2 | 3/2012 | Razazian et al. |
| 8,165,172 | B2 | 4/2012 | Razazian et al. |
| 9,100,261 | B2 | 8/2015 | Zeng et al. |
| 9,106,499 | B2 | 8/2015 | Zeng et al. |
| 2003/0123582 | A1 | 7/2003 | Kim et al. |
| 2005/0053259 | A1 | 3/2005 | Asano et al. |
| 2005/0152326 | A1 | 7/2005 | Vijayan et al. |
| 2006/0061329 | A1 | 3/2006 | Dawson |
| 2006/0116095 | A1 | 6/2006 | Henriksson |
| 2007/0058693 | A1 | 3/2007 | Aytur et al. |
| 2007/0121491 | A1 * | 5/2007 | Kaiki ..................... 370/222 |
| 2009/0041169 | A1 * | 2/2009 | Fujita et al. ............. 375/354 |
| 2009/0190510 | A1 * | 7/2009 | Kobayashi ............... 370/280 |
| 2010/0135335 | A1 | 6/2010 | Matsumoto et al. |
| 2011/0069774 | A1 | 3/2011 | Wang et al. |
| 2011/0200058 | A1 * | 8/2011 | Mushkin et al. ......... 370/475 |
| 2012/0155487 | A1 | 6/2012 | Du et al. |
| 2012/0170684 | A1 | 7/2012 | Yim et al. |
| 2014/0376540 | A1 | 12/2014 | Zeng et al. |

OTHER PUBLICATIONS

Zhidkov, "Performance Analysis and Optimization of OFDM Receiver With Blanking Nonlinearity in Impulsive Noise Environment", IEEE Transactions on Vehicular Technology, vol. 55, No. 1, 9 pgs (Jan. 2006).

Zhidkov, "Impulsive Noise Suppression in OFDM Based Communication Systems", IEEE Transactions on Consumer Electronics, vol. 49, No. 4, 5 pgs (Nov. 2003).

Zhidkov, "Analysis and Comparison of Several Simple Impulsive Noise Mitigation Schemes for OFDM Receivers", IEEE Transactions on Communications, vol. 56, No. 1, 5 pgs (Jan. 2008).

DiPietro, "An FFT Based Technique for Suppressing Narrow-Band Interference in PN Spread Spectrum Communications Systems," IEEE, 4 pgs (1989).

ERDF, "PLC G3 Physical Layer Specification", 46 pgs (Obtained from Internet May 2, 2013).

Zeng et al., "Frequency-Domain Amplitude Normalization for Symbol Correlation in Multi-Carrier Systems", U.S. Appl. No. 13/924,792, filed Jun. 24, 2013, 20 pgs.

Zeng et al., "Frequency-Domain Carrier Blanking for Multi-Carrier Systems", U.S. Appl. No. 13/924,940, filed Jun. 24, 2013, 22 pgs.

Zeng et al., "Frequency-Domain Frame Synchronization in Multi-Carrier Systems", U.S. Appl. No. 13/924,996, filed Jun. 24, 2013, 25 pgs.

Zeng et al., "Frequency-Domain Frame Synchronization in Multi-Carrier Systems", Filed Jun. 24, 2013, U.S. Appl. No. 13/924,996, Notice of Allowance mailed Jun. 8, 2015, 9 pgs.

Office Action dated Oct. 8, 2014, for Zeng et al., "Frequency-Domain Carrier Blanking for Multi-Carrier Systems", U.S. Appl. No. 13/924,940, filed Jun. 24, 2013, 17 pgs.

Office Action dated Nov. 24, 2014, for Zeng et al., "Frequency-Domain Frame Synchronization in Multi-Carrier Systems", U.S. Appl. No. 13/924,996, filed Jun. 24, 2013, 17 pgs.

Office Action dated Oct. 6, 2014, for Zeng et al., "Frequency-Domain Amplitude Normalization for Symbol Correlation in Multi-Carrier Systems", U.S. Appl. No. 13/924,792, filed Jun. 24, 2013, 17 pgs.

Response to Office Action dated Jan. 8, 2015, for Zeng et al., "Frequency-Domain Carrier Blanking for Multi-Carrier Systems", U.S. Appl. No. 13/924,940, filed Jun. 24, 2013, 10 pgs.

Response to Office Action dated Jan. 13, 2015, for Zeng et al., "Frequency-Domain Amplitude Normalization for Symbol Correlation in Multi-Carrier Systems", U.S. Appl. No. 13/924,792, filed Jun. 24, 2013, 8 pgs.

Response dated Feb. 24, 2015, for Zeng et al., "Frequency-Domain Frame Synchronization in Multi-Carrier Systems", U.S. Appl. No. 13/924,996, filed Jun. 24, 2013, 8 pgs.

Final Office Action mailed Apr. 24, 2015, for Zeng et al., "Frequency-Domain Carrier Blanking for Multi Carrier Systems", U.S. Appl. No. 13/924,940, filed Jun. 24, 2013, 20 pgs.

Notice of Allowance mailed Jun. 15, 2015, for Zeng et al., "Frequency-Domain Amplitude Normalization for Symbol Correlation in Multi-Carrier Systems", filed Jun. 24, 2013, U.S. Appl. No. 13/924,792, , 15 pgs.

* cited by examiner

FREQUENCY-DOMAIN SYMBOL AND FRAME SYNCHRONIZATION IN MULTI-CARRIER SYSTEMS

RELATED APPLICATIONS

This application is related in subject matter to the following concurrently filed applications: U.S. patent application Ser. No. 13/924,792, entitled "FREQUENCY-DOMAIN AMPLITUDE NORMALIZATION FOR SYMBOL CORRELATION IN MULTI-CARRIER SYSTEMS;" and U.S. patent application Ser. No. 13/924,996, entitled "FREQUENCY-DOMAIN FRAME SYNCHRONIZATION IN MULTI-CARRIER SYSTEMS;" each of which is hereby incorporated by reference in its entirety.

TECHNICAL FIELD

This technical field relates to symbol and frame synchronization for frames within received signals for multi-carrier communications.

BACKGROUND

In multi-carrier systems, data is transmitted on multiple subcarriers and then collected at a receiver for the multi-carrier system. OFDM (orthogonal frequency division multiplexed) signals are used by some multi-carrier systems where transmitted data is modulated on a number of closely spaced orthogonal subcarriers. Further, some multi-carrier systems utilize standard transmission protocols to facilitate the detection and synchronization of received signals. For example, a predefined preamble can be used to with respect to data transmissions to allow a receiver to perform both symbol synchronization and frame synchronization in order to determine a reference point to start demodulation of the transmitted signals. Modern power line communication (PLC) systems, for example, utilize a reference preamble and OFDM signals for multi-carrier communications across power lines between transmitters and receivers.

Symbol synchronization is typically required for the receiver to know the precise instant in time that the data is available on the transmission medium. For symbol synchronization in prior receivers, a time-domain correlation of received signal is typically performed with respect to reference symbols, such as P symbols (SYNCP) within the preamble for the G3-PLC standard for PLC systems. However, in the presence of interfering signals, such as tone interferers in PLC channels, symbol synchronization performance can be significantly degraded. In particular, impulsive noise and narrow band interference can result in poor symbol synchronization performance for PLC receivers. Further, PLC channels often include tone interferers and have significant channel and induced noise levels that exceed what is seen in other communication environments, such as UART (Universal Asynchronous Receive Transmit), USB (Universal Serial Bus) and other serial buses as well as RF (radio frequency) communication systems. As such, PLC channels represent particularly harsh environments for symbol synchronization in PLC receivers.

In addition to symbol synchronization, frame synchronization is typically required for a receiver to demodulate modulated data being received from multi-carrier signals through a communication medium. Some multi-carrier communication systems utilize one or more unique symbols within a reference preamble for frame synchronization, such as the SYNCM symbols within the preamble for the G3-PLC standard for PLC systems. In prior receiver systems, frame synchronization is typically performed using time-domain correlation. However, time-domain correlation does not provide accurate results for frame synchronization where the frame-sync symbol(s) (e.g., SYNCM symbol) is significantly degraded by noise or narrow-band interference within the communication channel. Further, such noise and narrow-band interference is a common characteristic of PLC channels, making frame synchronization difficult or unachievable when the noise degrades the frame-sync symbol(s).

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale

DETAILED DESCRIPTION

Figure 1:
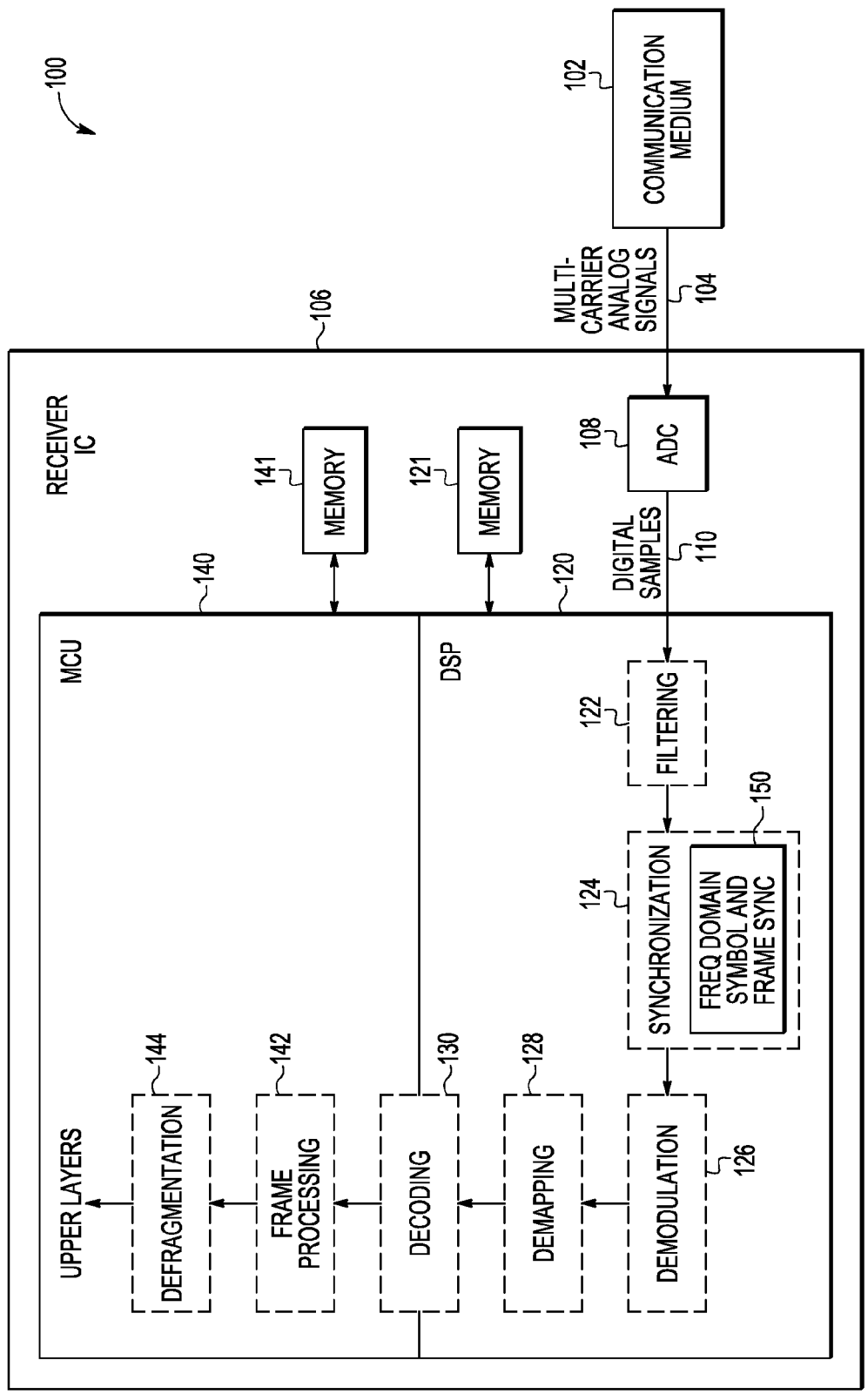
FIG. 1 is a block diagram of an example embodiment of a receiver system including frequency-domain symbol and frame synchronization.

Methods and systems are disclosed for frequency-domain symbol and frame synchronization for multi-carrier communication systems. Received signals are sampled and converted into frequency components associated with subcarriers within the multi-carrier communication signals. Symbol synchronization is performed in the frequency domain by performing correlation(s) between frequency components of the received signal and frequency-domain synchronization symbol(s). After symbol synchronization, frame synchronization correlation is also performed in the frequency domain between frequency components of the received signal and frequency-domain synchronization symbol(s). The disclosed embodiments are particularly useful for symbol and frame synchronization in multi-carrier received signals for power line communication (PLC) systems and/or other harsh noisy communication environments. Different features and variations can be implemented, as desired, and related or modified systems and methods can be utilized, as well.

Due to narrow band interference and impulsive noise, the traditional technique of performing time-domain correlation to detect symbol and frame boundaries will often fail to achieve reliable symbol and frame synchronization in harsh signal environments, particularly in PLC channel environments. To reduce the impact of the impulsive noise and narrow band interference on synchronization, the disclosed embodiments combine frequency-domain symbol synchronization correlation with frequency-domain frame synchronization correlation to improve the symbol and frame synchronization with respect to symbols within preambles for multi-carrier communications, such as the P symbols (SYNCP) and M symbols (SYNCM) in the preamble within the G3-PLC standard for PLC systems. As described herein, a FFT (Fast Fourier Transform) is used to generate frequency components for digital samples of received multi-carrier signals, and these frequency components can be normalized with respect to their amplitudes to improve noise performance, if desired, although non-normalized frequency components could also be utilized. Frequency-domain correlation is then performed between the acquired normalized frequency components and the frequency components of the reference symbols for symbol synchronization and frame synchronization. By utilizing frequency-domain correlation and amplitude normalization for both symbol synchronization and frame synchronization, the synchronization success rate in harsh signal environments is significantly improved, particularly in harsh signal environments such as exist typically for PLC channels. It is further noted that although G3-PLC standard is used for an example illustration of the disclosed embodiments, the disclosed embodiments can be utilized with other modern PLC standards and other non-PLC communication standards.

As described herein, symbol and frame synchronization for received multi-carrier signals are performed after using an FFT to generate frequency components related to digital samples for the received signals. Other techniques could also be utilized, if desired, to generate the frequency components. The symbol synchronization utilizes frequency components for a subset of stored digital samples (e.g., X samples if there are X samples per symbol) to compute a correlation value with respect to symbol reference symbol(s) (e.g., SYNCP symbol), shifts the digital samples by one sample, and recomputes a new correlation value. This shifting and recomputing is repeated to generate a number of symbol synchronization correlation values associated with the received samples. These symbol synchronization correlation values are then analyzed to determine a symbol boundary (e.g., edge timing for received symbols) for the received signals. Once the symbol boundary is detected, frame synchronization begins. Frame synchronization processes a subset of stored digital samples (e.g., X samples if there are X samples per symbol) to compute a correlation value with respect to frame reference symbol(s) (e.g., SYNCM symbol), shifts the digital samples by one symbol (e.g., X samples), and recomputes a new correlation value. This shifting and recomputing is repeated to generate a number of frame synchronization correlation values associated with the received samples. These frame synchronization correlation values are then analyzed to determine a frame boundary (e.g., beginning of data samples). It is noted that a reference preamble can be used for multi-carrier transmissions that include symbols configured to facilitate the detection of symbol boundaries (e.g., SYNCP symbols) within the receiver and symbols configured to facilitate detection of frame boundaries (SYNCM) within the receiver.

It is noted that the functional blocks described herein can be implemented using hardware, software, or a combination of hardware and software, as desired. In addition, one or more processors running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors to perform the operations and functions described herein.

FIG. 1 is a block diagram of an example embodiment 100 of a receiver system including frequency-domain symbol and frame synchronization block 150. For the embodiment 100 depicted, a receiver integrated circuit (IC) 106 is configured to receive multi-carrier analog signals 104 from a communication medium 102. The receiver IC 106 includes analog-to-digital converter (ADC) circuitry 108, digital signal processor (DSP) 120, and microcontroller unit (MCU) 140. One or more memories can also be included within receiver IC 106 and be coupled to DSP 120 and MCU 140, such as for example memory 141 and a memory 121. The DSP 120 includes filtering block 122, synchronization block 124, demodulation block 126, demapping block 128, and decoding block 130. The decoding block 130 also transitions into the MCU 140, which also includes frame processing block 142, and defragmentation block 144. The synchronization block 124 includes the frequency-domain symbol and frame synchronization block 150, which is described further below. It is noted that the receiver system depicted can also be implemented as a transceiver, if desired, such that the system also includes a transmitter and related operational blocks that allow the system to transmit multi-carrier signals through the communication medium 102. Other variations could also be implemented.

In operation, the received multi-carrier analog signals 104 are digitized by the ADC circuitry 108 to produce digital samples 110 associated with symbols within the received analog signals 104. The ADC circuitry 108 can be configured to generate only real (I) or both real (I) and imaginary (Q) components for each digital sample. The digital samples 110 are filtered by filtering block 122 and provided to synchronization block 124, although the filtering block could be removed, if desired. The frequency-domain symbol and frame synchronization block 150 within the synchronization block 124 operates to apply frequency-domain correlation to synchronize to symbols and data frames within the received signals, as described in more detail herein. The output from synchronization block 124 is demodulated by demodulation block 126 and demapped by demapping block 128, according to the modulation and mapping techniques used for the received signals. Decoding block 130 decodes the resulting values and provides decoded data to frame processing block 142. After the frames are processed, they are defragmented by defragmentation block 144. The resulting data can then be used and/or processed further by upper layer blocks, such as application layer blocks. Further, the receiver IC 106 can provide outputs to external processing blocks or devices for further processing, if desired.

It is noted that the communication medium 102 can be a wired medium, such as for example, a power line through which signals are communicated. The communication medium could also be a wireless medium, if desired. It also is noted that the multi-carrier analog signals 104 can be, for example, OFDM (orthogonal frequency division multiplexing) signals transmitted through power line channels according to standards for PLC (power line communication) transmissions, such as the G3-PLC standard for PLC systems. Other multi-carrier signals could also be utilized if desired. Further, it is noted that the receiver IC 106 can include additional and/or different functional blocks or could be implemented using other receiver configurations, as desired. For example, the receiver IC 106 could include a mixer configured to mix the incoming multi-carrier analog signals 104 to a lower frequency range prior to digitization by the ADC circuitry 108. Further, as indicated above, the IC 106 could be implemented as a transceiver and thereby include a transmitter and related operational blocks in addition to receiver related operational blocks. Other variations could also be implemented, if desired.

Figure 2:
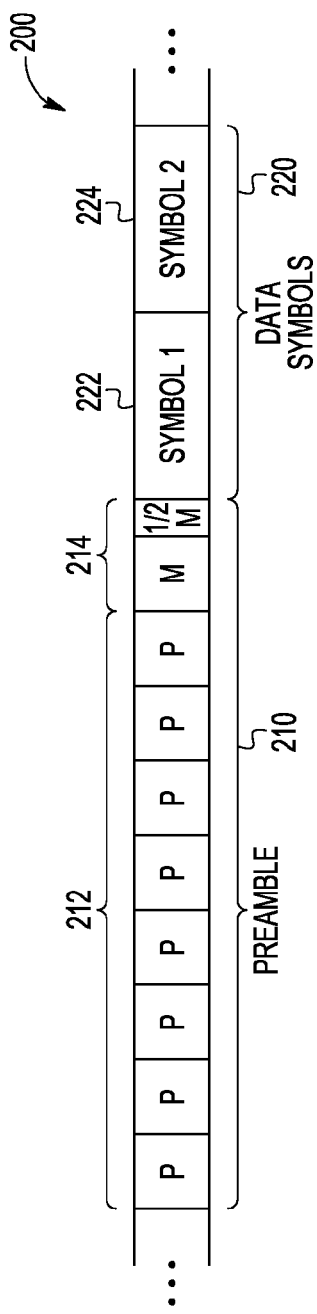
FIG. 2 is a signal diagram of an example embodiment of a multi-carrier signal including reference symbols as utilized in G3-PLC systems.

FIG. 2 is a signal diagram of an example embodiment 200 for a multi-carrier signal as utilized in PLC systems according to the G3-PLC standard. The transmitted signals include reference symbols within preamble 210 that are placed at the beginning of a transmission and data symbols 220 that provide the data payload for the transmission. The data symbols 220 include one or more symbols representing payload data, such as a first symbol (SYMBOL1) 222 and second symbol (SYMBOL2) 224. The preamble 210 includes eight (8) SYNCP reference symbols (P) 212 and one-and-a-half (1½) SYNCM reference symbols (M) for a total preamble length of 9½ symbols. The SYNCP symbols are identical and include a reference data sequence that can be used for symbol synchronization in G3-PLC receivers. The SYNCM symbol is the inverse of the SYNCP symbol and can be used for determination of the frame boundary in G3-PLC receivers. It is noted that header symbols within the preamble 210 can be part of the transmission that includes the data symbols 220 or can be transmitted separately. In addition, the preamble 210 can be present before or after the data symbols 220. It is further noted that a variety of reference symbols could be utilized and that reference symbols are typically designed to have good auto-correlation and cross-correlation properties. It is further noted that with respect to the preamble 210, different numbers of SYNCP symbols 212 and different numbers of SYNCM symbols could be utilized, including fractional numbers.

In contrast to prior solutions, the embodiments described herein apply frequency-domain correlation for symbol and frame synchronization. In particular, the embodiments described herein help to mitigate effects of noise in multi-carrier systems by applying symbol synchronization correlation and frame synchronization correlation in the frequency-domain. First, symbol synchronization is performed utilizing a frequency-domain correlation between frequency-domain components of digital samples for received signals and frequency components for reference symbol(s) to scan for a symbol boundary. When a symbol boundary is detected, frame synchronization is performed utilizing a frequency-domain correlation between frequency-domain components of digital samples for received symbols and frequency components for reference symbol(s) to search for a frame boundary. The disclosed embodiments effectively combat frequency selective noise by performing frequency-domain correlation both for synchronization to symbol reference symbol(s) in the preamble for multi-carrier signals (e.g., P symbols (SYNCP) within the G3-PLC standard for PLC systems) and for synchronization to frame reference symbol(s) (e.g., M symbol (SYNCM) within the G3-PLC standard for PLC systems). This application of frequency-domain correlation allows for detection of symbol and frame boundaries even where background noise and/or impulse noise would make such detection difficult due to destruction of one or more reference symbols within the received signals.

Figure 3:
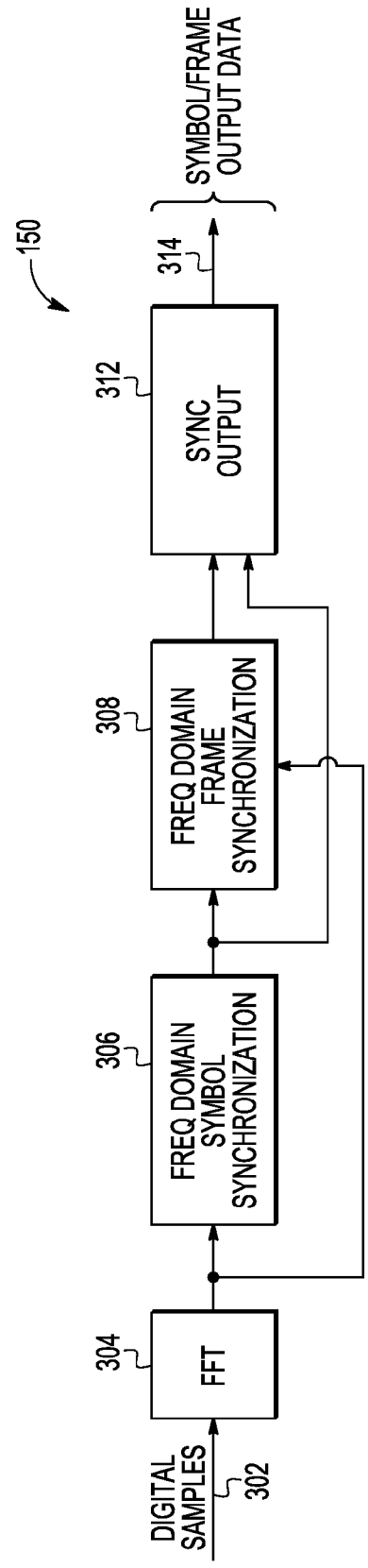
FIG. 3 is a block diagram of an example embodiment for processing multi-carrier input signals using frequency-domain symbol and frame synchronization blocks.

FIG. 3 is a block diagram of an example embodiment for frequency-domain symbol and frame synchronization block 150 for processing multi-carrier input signals. The input signals 302 can be digital samples associated with the received multi-carrier signals. If desired, these digital samples 302 can be filtered digital samples, for example, digital samples filtered by filtering block 122, as described above with respect to FIG. 1, although unfiltered digital samples could also be utilized. The digital samples 302 are provided to FFT (Fast Fourier Transform) block 304 that operates to transform the digital samples 302 into complex frequency-domain components relating to the subcarriers within the multi-carrier input signals. The frequency-domain components are provided to frequency-domain symbol synchronization block 306, which operates to detect symbols within the received signals and to synchronize to those symbols. Symbol synchronization outputs from the frequency-domain symbol synchronization block 306 are provided to the frequency-domain frame synchronization block 308. The frequency-domain frame synchronization block 308 also receives the frequency-domain components from FFT block 304 and operates to detect symbol frame boundaries and to synchronize to the frames. The synchronization output block 312 provides symbol/frame synchronization output data 314 based upon the symbol synchronization outputs from the symbol synchronization block 306 and based upon the frame synchronization outputs from the frame synchronization block 308. The symbol/frame output data 314 can provide frame synchronization information indicating whether or not frame synchronization has been achieved along with other desired information. Further, the symbol/frame output data 314 can be utilized by other functional blocks, such as the additional blocks shown in FIG. 1, where further processing can be conducted, as desired.

Figure 4:
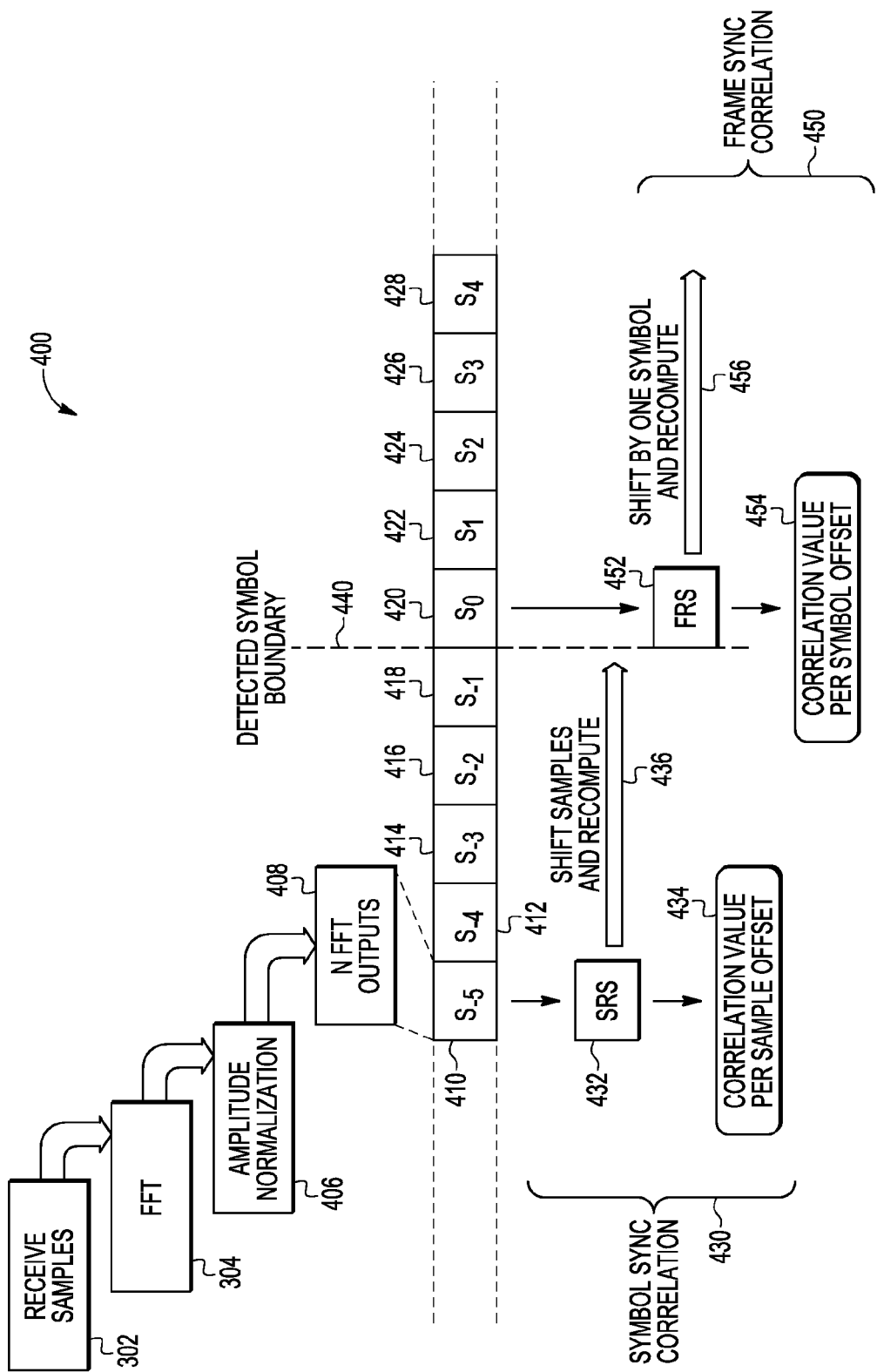
FIG. 4 is a signal processing diagram of an example embodiment for processing multi-carrier input signals using frequency-domain symbol and frame synchronization.

FIG. 4 is a signal processing diagram of an example embodiment 400 associated with the frequency-domain symbol and frame synchronization block 150 for processing multi-carrier input signals. The vertical dashed line 440 represents a detected symbol boundary, which is obtained for example through the symbol synchronization process described herein. Symbol 432 represents frequency components for a symbol reference symbol (SRS) associated within a reference preamble being utilized for the multi-carrier communications, such as the SYNCP symbols within the preamble described with respect to FIG. 2 above. The SRS 432 is designed to facilitate symbol boundary detection and is used for symbol synchronization, as described further below. Symbol 452 represents frequency components for a frame reference symbol (FRS) associated with a reference preamble being utilized for the multi-carrier communications, such as the SYNCM symbol within the preamble described with respect to FIG. 2 above. The FRS 452 is designed to facilitate frame boundary detection and is used for frame synchronization, as described further below. For the other symbols depicted, symbol ($S_{-5}$) 410, symbol ($S_{-4}$) 412, symbol ($S_{-3}$) 414, symbol ($S_{-2}$) 416, symbol ($S_{-1}$) 418, symbol ($S_0$) 420, symbol ($S_1$) 422, Symbol ($S_2$) 424, symbol ($S_3$) 426, and symbol ($S_4$) 428 represent received symbols within the multi-carrier signals being processed for symbol and frame synchronization. As depicted, for each of the received symbols within the received samples 302, an FFT block 304 is applied to generate frequency components that are normalized by amplitude normalization block 406 to produce N FFT frequency outputs 408, where N is the number of subcarriers within the multi-carrier signal. Non-normalized frequency components could also be utilized, if desired. Although embodiment 400 shows the N FFT outputs associated with symbol ($S_{-5}$) 410, similar FFT output values are also generated for each of the other received symbols. It is further noted that each of the reference symbols (SRS, FRS) 432 and 452 are frequency domain reference symbols having N subcarrier reference frequency components.

In operation, a symbol synchronization correlation 430 is first performed in the frequency domain to detect a symbol boundary, as represented by dashed line 440. For this frequency-domain symbol synchronization correlation, a complex multiplication is performed to multiply the SRS 432 with FFT output values for X samples within the received multi-carrier signal, assuming there are X samples per symbol. This complex multiplication is used to generate N values that are combined to generate a correlation value 434 associated with a sample offset within stored sample data for the received multi-carrier signal. A sample offset represents the relative location, and thereby relative time, of each sample. As represented by arrow 436, after each correlation value 434 is calculated, the sample values are shifted by one sample, and the correlation value is then recomputed with the shifted sample values. This calculation and shifting is repeated such that a number of correlation values are generated, with each correlation value being associated with a sample offset within the FFT sample values for the received signals. These symbol synchronization correlation values are then analyzed to detect the symbol boundary for received symbols within the multi-carrier signals. For example, the sample offset associated with a peak correlation value within the symbol synchronization correlation values can be selected as indicating the symbol boundary. In short, a sample offset representing the best correlation to the SRS 432 can be used to determine the symbol boundary, if desired. It is noted that non-complex multiplications could also be utilized depending upon the FFT outputs and reference symbol frequency components utilized. Other variations could be implemented, as desired.

Once symbol synchronization has been achieved to identify the symbol boundary (e.g., edge timing for received symbols), a frame synchronization correlation 450 is performed in the frequency domain to detect a frame boundary. For this frequency-domain frame synchronization correlation, a complex multiplication is performed to multiply the FRS 452 with FFT output values associated digital samples for received symbols (e.g., X samples per symbol) within the received multi-carrier signal, such as N FFT outputs 408 for symbol (S$_{-5}$) 410. This complex multiplication is used to generate N values that are combined to generate a correlation value 454 associated with a symbol offset within stored digital samples for the received multi-carrier signal. A symbol offset represents the relative location, and thereby relative time, of each symbol. As represented by arrow 456, after each correlation value 454 is calculated, the sample values are shifted by one symbol, and the correlation value is recomputed with the sample values shifted by one symbol. This calculation and shifting is repeated such that a number of frame synchronization correlation values 452 are generated with each correlation value being associated with a symbol offset within the samples for the received signals. These frame synchronization correlation values 452 are then analyzed to determine a frame boundary for the multi-carrier symbols within the received symbols. For example, the symbol offset associated with a peak correlation value within the frame synchronization correlation values 452 can be selected as indicating the frame boundary (e.g., beginning of data symbols). In short, a symbol offset indicating the best correlation to the FRS 452 can be used to determine the frame boundary, if desired. It is noted that non-complex multiplications could also be utilized depending upon the FFT outputs and reference symbol frequency components utilized. Other variations could be implemented, as desired.

Figure 5:
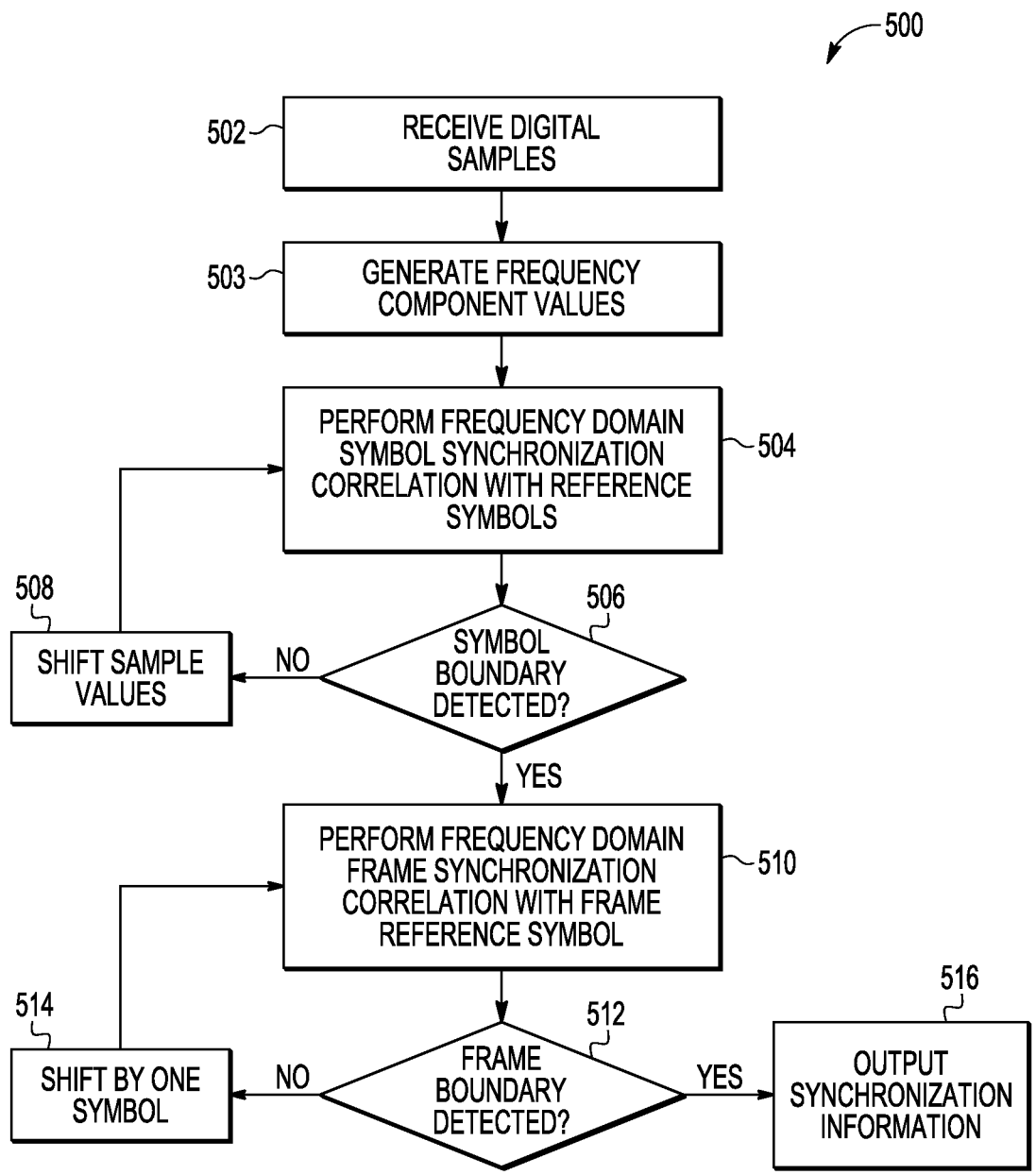
FIG. 5 is a process flow diagram of an example embodiment for processing multi-carrier input signals using frequency-domain symbol and frame synchronization.

FIG. 5 is a process flow diagram of an example embodiment 500 for frequency-domain symbol and frame synchronization for processing multi-carrier input signals. In block 502, digital samples are received for the received multi-carrier signals. In block 503, frequency component values are generated for digital samples for a symbol time period (e.g., X digital samples per symbol). In block 504, a symbol synchronization correlation is performed in the frequency-domain using frequency components for a reference symbol, such as reference symbol 432, along with the frequency component values to generate a symbol synchronization correlation value, as described herein. In block 506, a determination is made whether or not a symbol boundary has been detected, such as for example, if the correlation value exceeds a threshold value. If "NO," flow passes to block 508 where sample values are shifted by one sample, and a new correlation value is the generated in block 504. If the determination in block 506 is "YES," flow passes to block 510. In block 510, a frame synchronization correlation is performed in the frequency-domain using frequency components for a frame reference symbol, such as reference symbol 452, along with the frequency component values to generate a frame synchronization correlation value, as described herein. In block 512, a determination is made whether or not a frame boundary has been detected, such as for example, if the correlation value exceeds a threshold value. If "NO," flow passes to block 514 where sample values are shifted by one symbol (e.g., X digital samples per symbol). A new correlation value is then generated in block 510. If the determination in block 512 is "YES," flow passes to block 516 where synchronization information is output. As described above, these synchronization outputs can include an indication of the symbol boundary and the frame boundary along with other desired frame synchronization information. It is also noted that block 504 and block 510 could be repeated a number of times along with shifting blocks 508 and 514, respectively, to generate a number of correlation values prior to performing the determination steps in blocks 506 and 512, if desired. It is also noted that process blocks 503, 504, 506, and 508 can be performed by frequency domain symbol synchronization block 306 with respect to digital samples, and process blocks 510, 512, 514, and 516 can be performed by frequency domain frame synchronization block 308 with respect to digital samples. Other variations could also be implemented, as desired.

Figure 6:
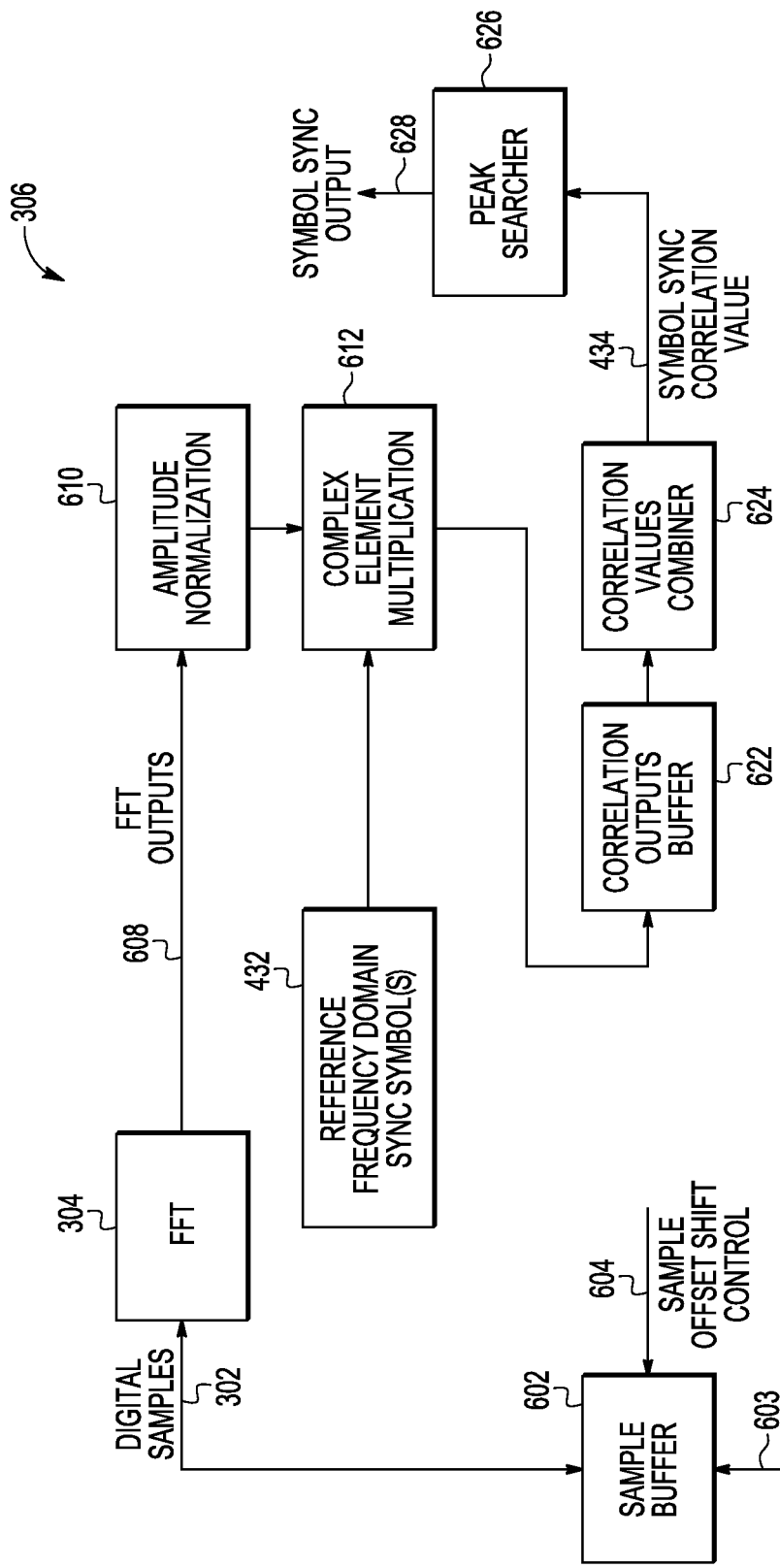
FIG. 6 is a detailed block diagram of an example embodiment of a frequency-domain symbol synchronization block for processing multi-carrier input signals.

FIG. 6 is a detailed block diagram of an example embodiment for frequency-domain symbol synchronization block 306 for processing multi-carrier input signals. For this embodiment, input digital samples 603 are stored in a sample buffer 602 (e.g., circular buffer), and sample offset shift control signal 604 is provided to the sample buffer 602 to shift the output digital samples 302 by one sample offset. A sample offset represents the relative location, and thereby relative time, of each sample within the buffer 702. It is assumed that there are X samples associated with each symbol where X depends upon the sample rate and the symbol time period (i.e., the transmit time period for each symbol) for the communication protocol being utilized. For example, with the G3-PLC standard, a sampling rate of 400 ksps (kilo samples per second) can be used for a symbol time period of 715 microseconds to generate 256 samples per symbol after removal of the 30 sample cyclic prefix. Digital samples 302 for one symbol are provided to FFT block 304, which generates N frequency components associated with the N subcarriers within the multi-carrier received signals. These FFT outputs 608 are then provided to amplitude normalization block 610 where the amplitudes for the frequency components are normalized, for example, with respect to themselves. Non-normalized frequency components could also be utilized, if desired. Complex element multiplication block 612 then performs a complex multiplication of reference frequency-domain synchronization symbol(s) 432 with the normalized or non-normalized FFT outputs. The result of the complex multiplication in block 612 is provided to buffer 622 that stores the resulting correlation values. The correlation values are then combined within combiner block 624 and output as a symbol synchronization correlation value 424. The sample offset shift control signal 604 is used to repeatedly shift the samples in the sample buffer by one sample so that a symbol synchronization correlation value 424 is generated for each of a number of different sample offsets for the samples within the buffer 602. A peak searcher block 626 analyzes the symbol synchronization correlation values 434 to detect a symbol boundary for the received symbols. The peak searcher block 626 generates symbol synchronization outputs 628. The symbol synchronization outputs 628 can include symbol timing information, peak correlation values, and/or other desired symbol synchronization information.

Advantageously, the symbol synchronization embodiment in FIG. 6 operates to identify the best correlation between the reference synchronization symbols 432 and the digital samples for the received signals over a range of sample offset (i.e., time) shifts. It is noted that FFT outputs 608 are frequency components within the transmission band for the signals being received through a communication medium. It is also noted the peak searcher 626 can be configured to analyze values for multiple sample offsets at a time or a single sample offset at a time, as desired. Further, it is noted that an additional FFT block can be used between blocks 612 and 622 to effectively generate correlation values for multiple sample offsets, thereby providing an equivalent operation to shifting samples within sample buffer 602. Other variations could also be implemented, as desired. It is further noted that the symbol synchronization techniques, including the per-carrier amplitude normalization techniques, described in concurrently filed U.S. patent application Ser. No. 13/924,792, entitled "FREQUENCY-DOMAIN AMPLITUDE NORMALIZATION FOR SYMBOL CORRELATION IN MULTI-CARRIER SYSTEMS," which is hereby incorporated by reference in its entirety, can also be utilized with respect to the frequency domain symbol synchronization embodiments described herein.

Figure 7:
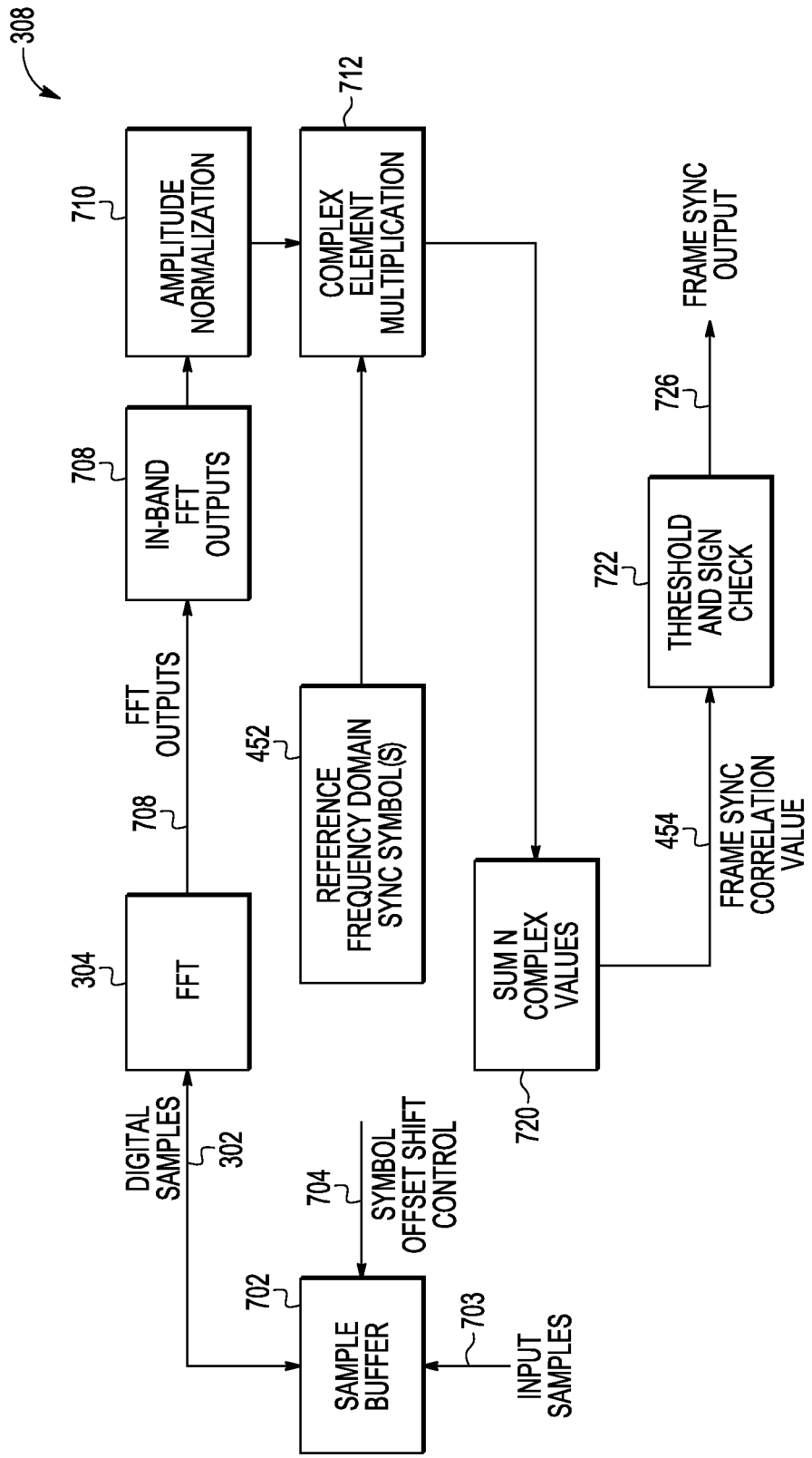
FIG. 7 is a detailed block diagram of an example embodiment of a frequency-domain frame synchronization block for processing multi-carrier input signals.

FIG. 7 is a detailed block diagram of an example embodiment for frequency-domain frame synchronization block 308 for processing multi-carrier input signals. For the embodiment depicted, input digital samples 703 are stored in a sample buffer 702 (e.g., circular buffer), and symbol offset shift control signal 704 is provided to the sample buffer 702 to shift the output digital samples 302 by one symbol offset. A symbol offset represents the relative location, and thereby relative time, of each symbol within the buffer 702. It is again assumed that there are X samples associated with each symbol. Digital samples 302 for one symbol are provided to FFT block 704, which generates N frequency components associated with the N subcarriers within the multi-carrier received signals. These FFT outputs 708 are provided to amplitude normalization block 710 where the amplitudes for the frequency components are normalized, for example, with respect to themselves. Non-normalized frequency components could also be utilized. Complex element multiplication block 712 then performs a complex multiplication of frequency-domain synchronization symbol(s) 452 with the normalized or non-normalized FFT outputs. The result of the complex multiplication in block 712 is provided to summation block 720. Summation block 710 sums the N values from block 712 and provides the summed result as frame synchronization correlation value 454 to threshold check block 712.

The threshold check block 712 compares the correlation value 454 to a threshold value to determine if frame synchronization has been detected. For example, if the summed result exceeds a threshold value, frame synchronization boundary can be determined to have been detected. The threshold check block 712 can also be configured to check the sign of the summed result as a further indication of frame synchronization. The symbol offset shift control signal 704 is used to repeatedly shift the samples in the sample buffer by one symbol so that a frame synchronization correlation value 454 is generated for each of a number of different symbol offsets for the samples within the buffer 602. Frame synchronization outputs 726 can then be output for further processing. The frame synchronization output signals 726 can include a frame synchronization flag indicating whether or not frame synchronization has been detected, frame boundary information, frame timing information, and/or other desired information. Other variations could be implemented, as desired.

Advantageously, the frame synchronization embodiment in FIG. 7 operates to identify the best correlation between the reference synchronization symbols 452 and the digital samples for the received symbols over a range of symbol offset (i.e., time) shifts. It is further noted that the frame synchronization techniques, including the two-dimensional sliding window analysis techniques, described in concurrently filed U.S. patent application Ser. No. 13/924,996, entitled "FREQUENCY-DOMAIN FRAME SYNCHRONIZATION IN MULTI-CARRIER SYSTEMS," which is hereby incorporated by reference in its entirety, can also be utilized with respect to the frequency domain frame synchronization embodiments described herein.

It is noted that buffers 602 and 702 in FIG. 6 and FIG. 7 can be implemented as a circular buffer, a shift register, and/or any other desired buffer configured to store input digital samples 603 and 703. Further, the buffers can be clocked using symbol timing from a symbol timing detector included within the receiver system, if desired. For example, the synchronization block 124 in FIG. 1 can include a symbol timing detector that detects symbol timing for the received signals. It is noted that one or more counters can be used with respect to the functional blocks shown in FIG. 6, such as for example, to provide a timeout mechanism for symbol synchronization. It is also noted that one or more counters can be used with respect to the functional blocks shown in FIG. 7 for each frame detection cycle, such as for example, to provide a timeout for frame synchronization. For example, counter(s) can be utilized to keep track of how much time has elapsed since a first synchronization symbol (e.g., SYNCP symbol) was detected. This timing can be used, for example, to determine when enough time has elapsed to account for all reference symbols within a reference preamble without frame synchronization. If a counter limit is reached without frame synchronization, the frame synchronization algorithm can be configured to abort and a decision regarding further frame synchronization processing can be made.

As described herein, the frequency-domain symbol and frame synchronization for the received signals improves symbol and frame synchronization performance, particularly where noise and/or interference destroys or degrades the frame synchronization symbols within the received signals. In other words, where symbol and/or frame synchronization information within a preamble is compromised, the frequency-domain symbol and frame synchronization determination can be utilized to still allow for symbol and frame boundaries to be successfully detected.

Figure 8:
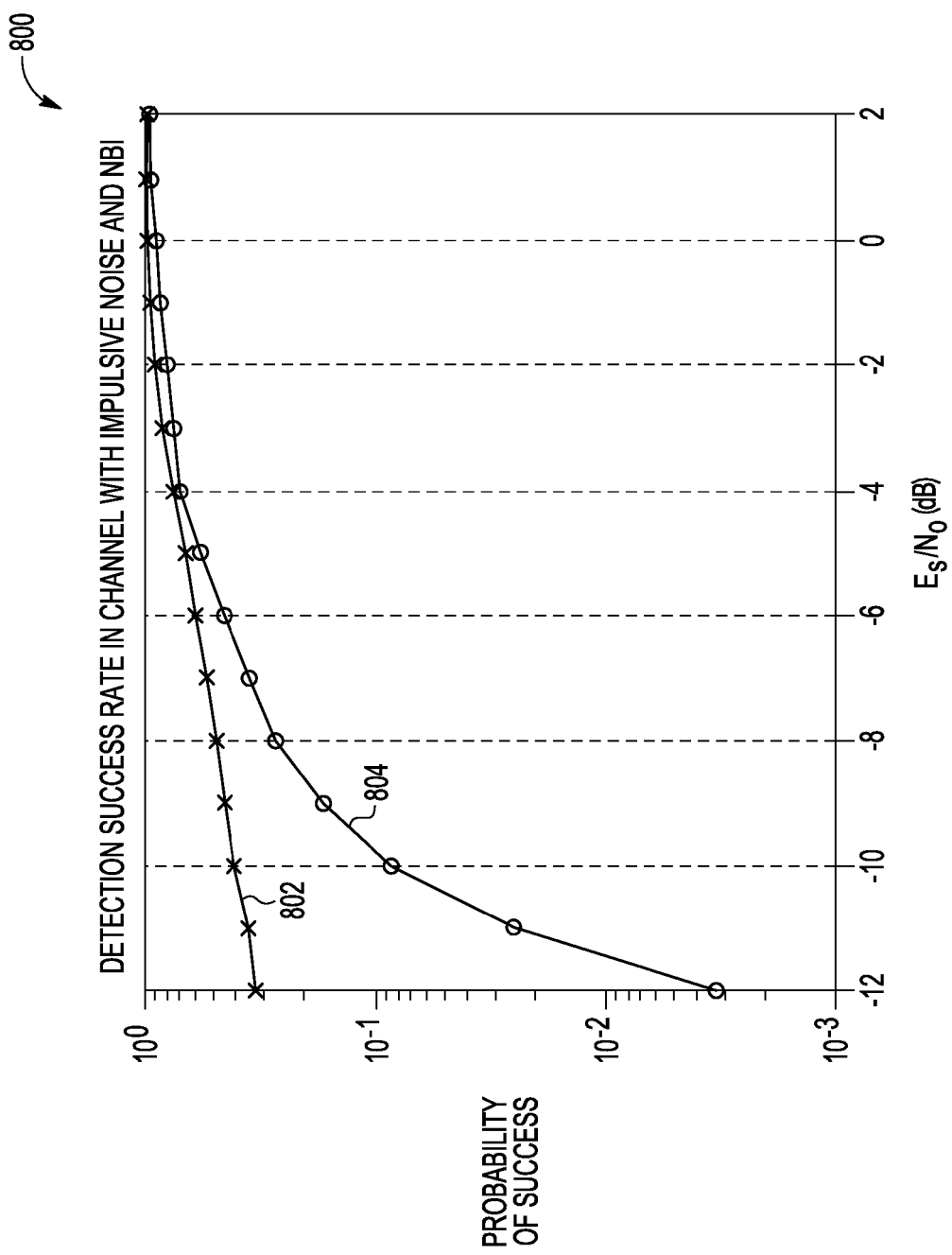
FIG. 8 is an example embodiment of a representative diagram comparing results with and without the use of frequency-domain symbol and frame synchronization.

FIG. 8 is an example embodiment 800 of a representative diagram comparing results for use and non-use of frequency-domain symbol and frame synchronization in the presence of impulsive noise and narrow band interference (NBI). The x-axis represents the energy of the received symbol ($E_S$) with respect to the noise ($N_O$) in the communication channel in decibels (dB). The y-axis represents a logarithmic scale for the probability of success for detecting frame boundaries for frame synchronization. Line 802 represents the success detection rate where frequency-domain symbol and frame synchronization is utilized to detect a symbol boundary and a frame boundary, as described herein. Line 804 represents the success detection rate without using this frequency-domain symbol and frame synchronization. As seen in FIG. 8, the success detection rate with respect to line 802 (use of frequency-domain symbol and frame synchronization) is a significant improvement over the success detection rate with respect to line 804 (without use of frequency-domain symbol and frame synchronization), particularly for lower signal-to-noise ratios ($E_S/N_O$).

It is again noted that the frequency-domain correlation techniques described herein could be used in combination with one or more other detection stages, as desired. Other variations could also be implemented, as desired, while still utilizing the frequency-domain symbol and frame synchronization described herein to provide frequency-domain correlation to detect symbol and frame boundaries for multi-carrier signals, such as OFDM signals in G3-PLC communications.

As described herein, a variety of embodiments can be implemented and different features and variations can be implemented, as desired.

One embodiment is a method for symbol and frame synchronization for multi-carrier signals including receiving input signals from a communication medium, digitizing the input signals to generate digital samples, generating frequency component sample values for the digital samples with the frequency component sample values being associated with symbols within the input signals, performing a frequency-domain symbol synchronization correlation of the frequency component sample values with predetermined frequency components for one or more symbol reference symbols to determine a symbol boundary, after a symbol boundary has been determined performing a frequency-domain frame synchronization correlation of the frequency component sample values with frequency components for one or more predetermined frame reference symbols to determine a frame boundary, and outputting synchronization output data associated with the performing steps.

In further embodiments, the generating step can include applying a Fast Fourier Transform (FFT) to the digital samples to generate the frequency component sample values. Further, the method can further include normalizing the frequency component sample values by their amplitudes prior to the performing step. Still further, the step of performing a frequency-domain symbol synchronization correlation can include determining a symbol synchronization correlation value based upon a multiplication of the frequency component sample values with the frequency components for the one or more symbol reference symbols, providing additional symbol correlation values by shifting frequency component sample values by one sample and repeating the determining step for each shift, and utilizing the symbol synchronization correlation values to determine a symbol boundary. For other embodiments, the utilizing step can include searching the symbol synchronization correlation values for a peak above a threshold value to determine a symbol boundary. In addition, the performing a frequency-domain frame synchronization correlation step can include determining frame synchronization correlation value based upon a multiplication of the frequency component sample values with the frequency components for the one or more frame reference symbols, providing additional frame correlation values by shifting frequency component sample values by one symbol and repeating the determining step for each shift, and utilizing the plurality of frame synchronization correlation values to determine a frame boundary. In still further embodiments, the utilizing step can include searching the frame synchronization correlation values for a peak above a threshold value to determine the frame boundary. Further, the method can include utilizing a counter to limit the repeating step and outputting an indication of no frame boundary detection if a limit is reached. Still further, the method can include storing the frequency component sample values within a buffer prior to the performing step. In addition, the reference symbols can be OFDM symbols, and the reference symbols can be symbols within a preamble for the G3-PLC standard for power line communication (PLC) systems. In other embodiments, the method can include transmitting multi-carrier signals to the communication medium.

One other embodiment is a system for symbol and frame synchronization for multi-carrier signals including analog-to-digital conversion circuitry configured to receive input signals from a communication medium and to output digital samples, a Fast Fourier Transform (FFT) block configured to receive the digital samples and to generate frequency component sample values associated with symbols within the input signals, a symbol synchronization correlation block configured to correlate the frequency component sample values with predetermined frequency components for one or more symbol reference symbols to determine a symbol boundary, a frame synchronization correlation block configured to correlate the frequency component sample values with predetermined frequency components for one or more frame reference symbols to determine a frame boundary after a symbol boundary has been determined, and a synchronization output block configured to output synchronization data associated with the symbol synchronization correlation block and the frame synchronization correlation block.

In further embodiments, the system can include a digital signal processor (DSP) including the FFT block, the symbol synchronization correlation block, the frame synchronization correlation block, and the synchronization output block. Further, the system can include an amplitude normalization block configured to normalize the frequency component sample values by their amplitude, and the symbol synchronization correlation block and the frame synchronization correlation block can be configured to utilize the amplitude normalized frequency component sample values. Still further, the symbol synchronization correlation block can include a multiplier block configured to generate symbol synchronization correlation values based upon multiplications of the frequency component sample values with the frequency components for the one or more symbol reference symbols with each symbol correlation value being based upon a different subset of frequency component sample values and can include a symbol synchronization output block configured to utilize the symbol synchronization correlation values to determine a symbol boundary. For other embodiments, the system can include a peak detector configured to search the symbol synchronization correlation values for a peak above a threshold value to determine the symbol boundary. In addition, the frame synchronization correlation block can include a multiplier block configured to generate frame synchronization correlation values based upon multiplications of the frequency component sample values with the frequency components for the one or more frame reference symbols with each frame correlation value being based upon a different subset of frequency component sample values and can include a frame synchronization output block configured to utilize the symbol synchronization correlation values to determine a symbol boundary. In still further embodiments, the system can include a peak detector configured to search the frame synchronization correlation values for a peak above a threshold value to determine the frame boundary. Further, the system can include a buffer configured to store the frequency component sample values. Still further, the communication medium can be a power line communication medium, and the reference symbols can be symbols within a preamble for the G3-PLC standard for power line communication (PLC) systems.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for symbol and frame synchronization for multi-carrier signals, comprising:
   receiving input signals from a communication medium;
   digitizing the input signals to generate digital samples;
   generating frequency component sample values for the digital samples, the frequency component sample values being associated with symbols within the input signals;
   performing a frequency-domain symbol synchronization correlation of the frequency component sample values with predetermined frequency components for one or more symbol reference symbols to determine a symbol boundary;
   after a symbol boundary has been determined, performing a frequency-domain frame synchronization correlation of the frequency component sample values with frequency components for one or more predetermined frame reference symbols to determine a frame boundary; and
   outputting synchronization output data associated with the performing steps;
   wherein the performing a frequency-domain symbol synchronization correlation comprises:
      determining a symbol synchronization correlation value based upon a multiplication of the frequency component sample values with the frequency components for the one or more symbol reference symbols;
      providing additional symbol correlation values by shifting frequency component sample values by one sample and repeating the determining step for each shift; and
      utilizing the symbol synchronization correlation values to determine a symbol boundary.

2. The method of claim 1, wherein the generating step comprises applying a Fast Fourier Transform (FFT) to the digital samples to generate the frequency component sample values.

3. The method of claim 1, further comprising normalizing the frequency component sample values by their amplitudes prior to the performing step.

4. The method of claim 1, wherein the utilizing step comprises searching the symbol synchronization correlation values for a peak above a threshold value to determine a symbol boundary.

5. The method of claim 1, further comprising storing the frequency component sample values within a buffer prior to the performing step.

6. The method of claim 1, wherein the reference symbols comprise OFDM symbols, and wherein the reference symbols comprise symbols within a preamble for the G3-PLC standard for power line communication (PLC) systems.

7. The method of claim 1, further comprising transmitting multi-carrier signals to the communication medium.

8. A method for symbol and frame synchronization for multi-carrier signals, comprising:
   receiving input signals from a communication medium;
   digitizing the input signals to generate digital samples;
   generating frequency component sample values for the digital samples, the frequency component sample values being associated with symbols within the input signals;
   performing a frequency-domain symbol synchronization correlation of the frequency component sample values with predetermined frequency components for one or more symbol reference symbols to determine a symbol boundary;
   after a symbol boundary has been determined, performing a frequency-domain frame synchronization correlation of the frequency component sample values with frequency components for one or more predetermined frame reference symbols to determine a frame boundary; and
   outputting synchronization output data associated with the performing steps;
   wherein the performing a frequency-domain frame synchronization correlation comprises:
      determining frame synchronization correlation value based upon a multiplication of the frequency component sample values with the frequency components for the one or more frame reference symbols;
      providing additional frame correlation values by shifting frequency component sample values by one symbol and repeating the determining step for each shift; and
      utilizing the plurality of frame synchronization correlation values to determine a frame boundary.

9. The method of claim 8, wherein the utilizing step comprises searching the frame synchronization correlation values for a peak above a threshold value to determine the frame boundary.

10. The method of claim 8, further comprising utilizing a counter to limit the repeating step and outputting an indication of no frame boundary detection if a limit is reached.

11. The method of claim 8, wherein the generating step comprises applying a Fast Fourier Transform (FFT) to the digital samples to generate the frequency component sample values.

12. The method of claim 8, further comprising normalizing the frequency component sample values by their amplitudes prior to the performing step.

13. The method of claim 8, further comprising storing the frequency component sample values within a buffer prior to the performing step.

14. The method of claim 8, wherein the reference symbols comprise OFDM symbols, and wherein the reference symbols comprise symbols within a preamble for the G3-PLC standard for power line communication (PLC) systems.

15. The method of claim 8, further comprising transmitting multi-carrier signals to the communication medium.

16. A system for symbol and frame synchronization for multi-carrier signals, comprising:
   analog-to-digital conversion circuitry configured to receive input signals from a communication medium and to output digital samples;
   a Fast Fourier Transform (FFT) block configured to receive the digital samples and to generate frequency component sample values associated with symbols within the input signals;
   a symbol synchronization correlation block configured to correlate the frequency component sample values with predetermined frequency components for one or more symbol reference symbols to determine a symbol boundary;
   a frame synchronization correlation block configured to correlate the frequency component sample values with predetermined frequency components for one or more frame reference symbols to determine a frame boundary after a symbol boundary has been determined; and
   a synchronization output block configured to output synchronization data associated with the symbol synchronization correlation block and the frame synchronization correlation block;
   wherein the symbol synchronization correlation block comprises:
      a multiplier block configured to generate symbol synchronization correlation values based upon multiplications of the frequency component sample values with the frequency components for the one or more symbol reference symbols, each symbol correlation value being based upon a different subset of frequency component sample values; and
      a symbol synchronization output block configured to utilize the symbol synchronization correlation values to determine a symbol boundary.

17. The system of claim 16, further comprising a digital signal processor (DSP) including the FFT block, the symbol synchronization correlation block, the frame synchronization correlation block, and the synchronization output block.

18. The system of claim 16, further comprising an amplitude normalization block configured to normalize the frequency component sample values by their amplitude, and wherein the symbol synchronization correlation block and the frame synchronization correlation block are configured to utilize the amplitude normalized frequency component sample values.

19. The system of claim 16, further comprising a peak detector configured to search the symbol synchronization correlation values for a peak above a threshold value to determine the symbol boundary.

20. The system of claim 16, further comprising a buffer configured to store the frequency component sample values.

21. The system of claim 16, wherein the communication medium comprises a power line communication medium, and wherein the reference symbols comprise symbols within a preamble for the G3-PLC standard for power line communication (PLC) systems.

22. A system for symbol and frame synchronization for multi-carrier signals, comprising:
   analog-to-digital conversion circuitry configured to receive input signals from a communication medium and to output digital samples;
   a Fast Fourier Transform (FFT) block configured to receive the digital samples and to generate frequency component sample values associated with symbols within the input signals;
   a symbol synchronization correlation block configured to correlate the frequency component sample values with predetermined frequency components for one or more symbol reference symbols to determine a symbol boundary;
   a frame synchronization correlation block configured to correlate the frequency component sample values with predetermined frequency components for one or more frame reference symbols to determine a frame boundary after a symbol boundary has been determined; and
   a synchronization output block configured to output synchronization data associated with the symbol synchronization correlation block and the frame synchronization correlation block;
   wherein the frame synchronization correlation block comprises:
      a multiplier block configured to generate frame synchronization correlation values based upon multiplications of the frequency component sample values with the frequency components for the one or more frame reference symbols, each frame correlation value being based upon a different subset of frequency component sample values; and
      a frame synchronization output block configured to utilize the symbol synchronization correlation values to determine a symbol boundary.

23. The system of claim 22, further comprising a peak detector configured to search the frame synchronization correlation values for a peak above a threshold value to determine the frame boundary.

24. The system of claim 22, further comprising a digital signal processor (DSP) including the FFT block, the symbol synchronization correlation block, the frame synchronization correlation block, and the synchronization output block.

25. The system of claim 22, further comprising an amplitude normalization block configured to normalize the frequency component sample values by their amplitude, and wherein the symbol synchronization correlation block and the frame synchronization correlation block are configured to utilize the amplitude normalized frequency component sample values.

26. The system of claim 22, further comprising a buffer configured to store the frequency component sample values.

27. The system of claim 22, wherein the communication medium comprises a power line communication medium, and wherein the reference symbols comprise symbols within a preamble for the G3-PLC standard for power line communication (PLC) systems.

* * * * *